Aug. 16, 1955 R. A. FELBURG 2,715,560

HOUSING FOR ELECTRONIC CHASSIS

Filed May 25, 1954 4 Sheets-Sheet 1

INVENTOR.
ROBERT A. FELBURG
BY Jerome P. Bloom
AND
Wade Koontz
ATTORNEYS

Aug. 16, 1955 R. A. FELBURG 2,715,560

HOUSING FOR ELECTRONIC CHASSIS

Filed May 25, 1954 4 Sheets-Sheet 2

INVENTOR.
ROBERT A. FELBURG
BY Jerome P. Bloom
AND
Wade Koontz
ATTORNEYS

Aug. 16, 1955 R. A. FELBURG 2,715,560

HOUSING FOR ELECTRONIC CHASSIS

Filed May 25, 1954 4 Sheets-Sheet 3

ROBERT A. FELBURG
INVENTOR.
BY Jerome P. Bloom
AND
Wade Koontz
ATTORNEYS

Aug. 16, 1955 R. A. FELBURG 2,715,560

HOUSING FOR ELECTRONIC CHASSIS

Filed May 25, 1954 4 Sheets-Sheet 4

INVENTOR.
ROBERT A. FELBURG
BY Jerome P. Bloom
Wade Koontz AND
ATTORNEYS

United States Patent Office 2,715,560
Patented Aug. 16, 1955

2,715,560

HOUSING FOR ELECTRONIC CHASSIS

Robert A. Felburg, Los Angeles, Calif., assignor to the United States of America as represented by the Secretary of the Air Force Application May 25, 1954, Serial No. 432,335

4 Claims. (Cl. 312—298)

This invention relates to a new and improved electronic chassis construction and is particularly directed to an open framework type of chassis such as may be used in a pressurized air conditioned container having a source of power therein. The novel chassis is adaptable for mounting any instrument assemblies thereon desired at the point of location of the framework so that each unit mounted thereon is freely accessible and open to inspection and so that ready servicing and replacement may be made where necessary at the point of location of the chassis.

The practical embodiment of the invention presented herein consists of a cylindrical framework or rack assembly open on all sides with sections thereof arranged for simple pivotal arrangement on a vertical axis so as to swing outward of the periphery of the rack in pivotal relation thereto for either mounting of equipment or servicing of equipment on the rack. This rack is arranged for mounting within a container having power connections thereto and includes an adapter thereon for establishing connection of said power means to the instrument units mounted on the rack. By this arrangement the framework may be hoisted clear of the container while maintaining electrical connections to the instrumentation for easy testing of the equipment on the rack assembly and servicing thereof. The construction of the novel chassis enables, moreover, a compact arrangement of instrument units within a minimum space while maintaining easy accessibility to all units so mounted. As will be readily obvious from the following description this invention presents a distinct advance in the art.

An object of this invention is to provide an improved electronic chassis construction whereby a highly compact arrangement of desired electronic equipment may be mounted thereon with complete accessibility to all equipment when wanted for ready and easy servicing or replacement.

A further object of this invention is to provide an improved electronic chassis comprising an open framework with equipment mounting sections pivotally connected at its periphery and having a power adapter secured to the bottom thereof for use in combination with a pressurized air conditioned container having a power connection therein.

Another object of the invention is to provide an improved electronic chassis construction comprising a cylindrical rack employing an open framework.

An additional object of the invention is to provide a new and improved electronic chassis construction consisting of an open framework having chassis portions hinged to its perimeter for opening outwardly therefrom about a vertical axis.

Other objects and advantages of the invention will become readily apparent to those versed in the art from the following description taken in conjunction with the accompanying drawings wherein.

Figure 4:
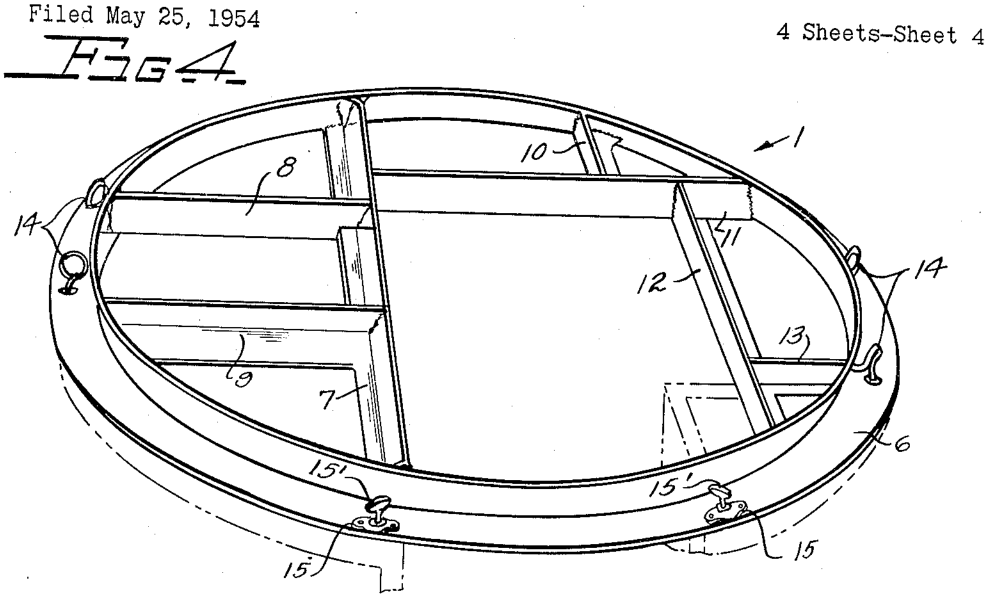

Fig. 4 of the drawings is a perspective detail view of the upper framework cover of the novel chassis.

Figure 5:
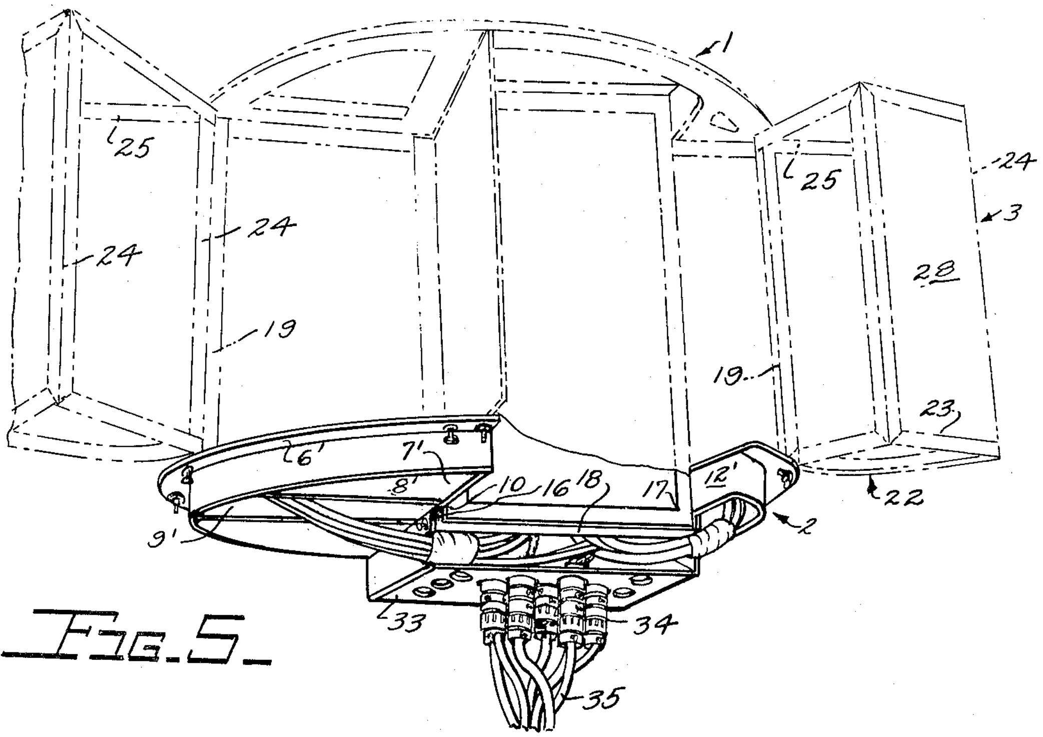

Fig. 5 shows a perspective detail view of the lower frame-work cover with the power adapter mounted thereon.

Figure 1:
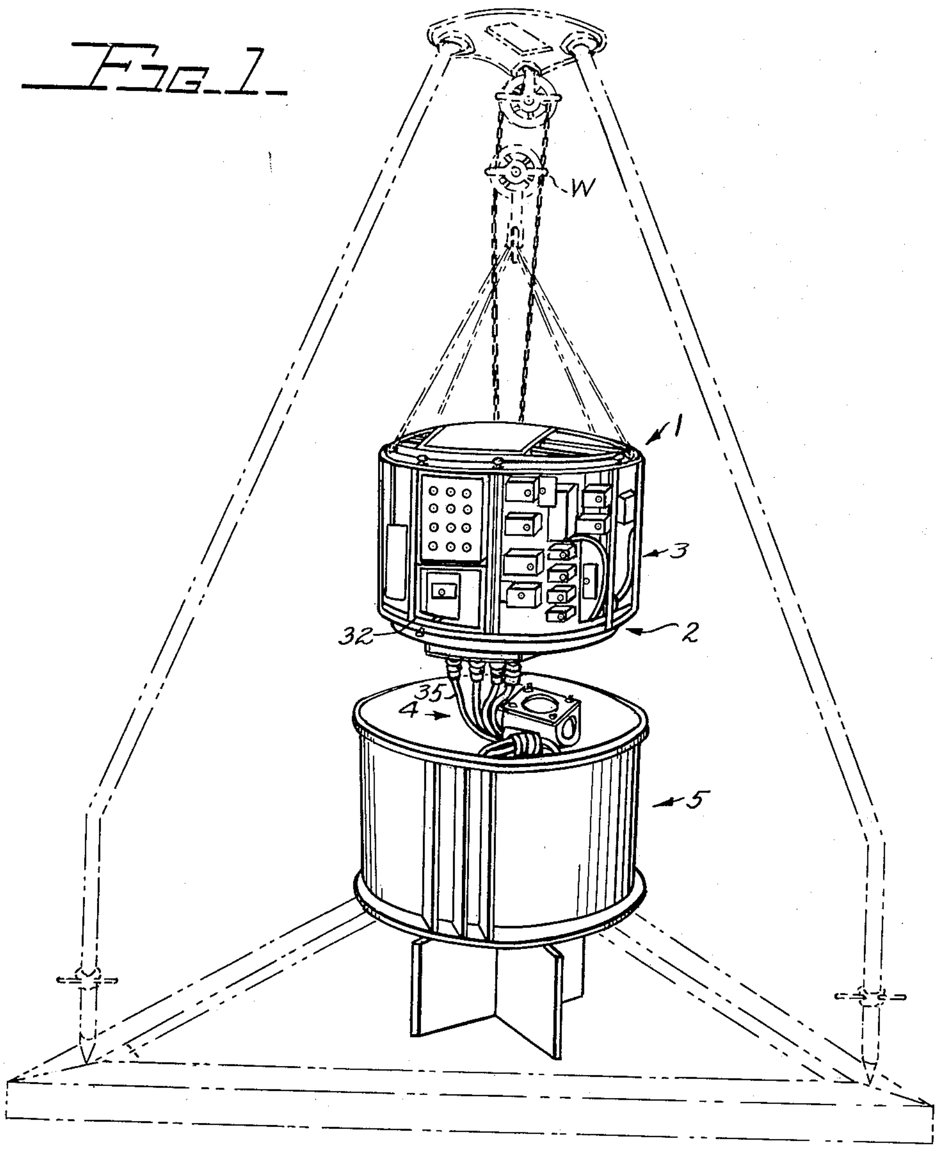
Fig. 1 is a front view of the novel electronic chassis loaded and in hoisted condition relative to a container for inspection or maintenance purposes with electronic equipment mounted thereon.
Figure 2:
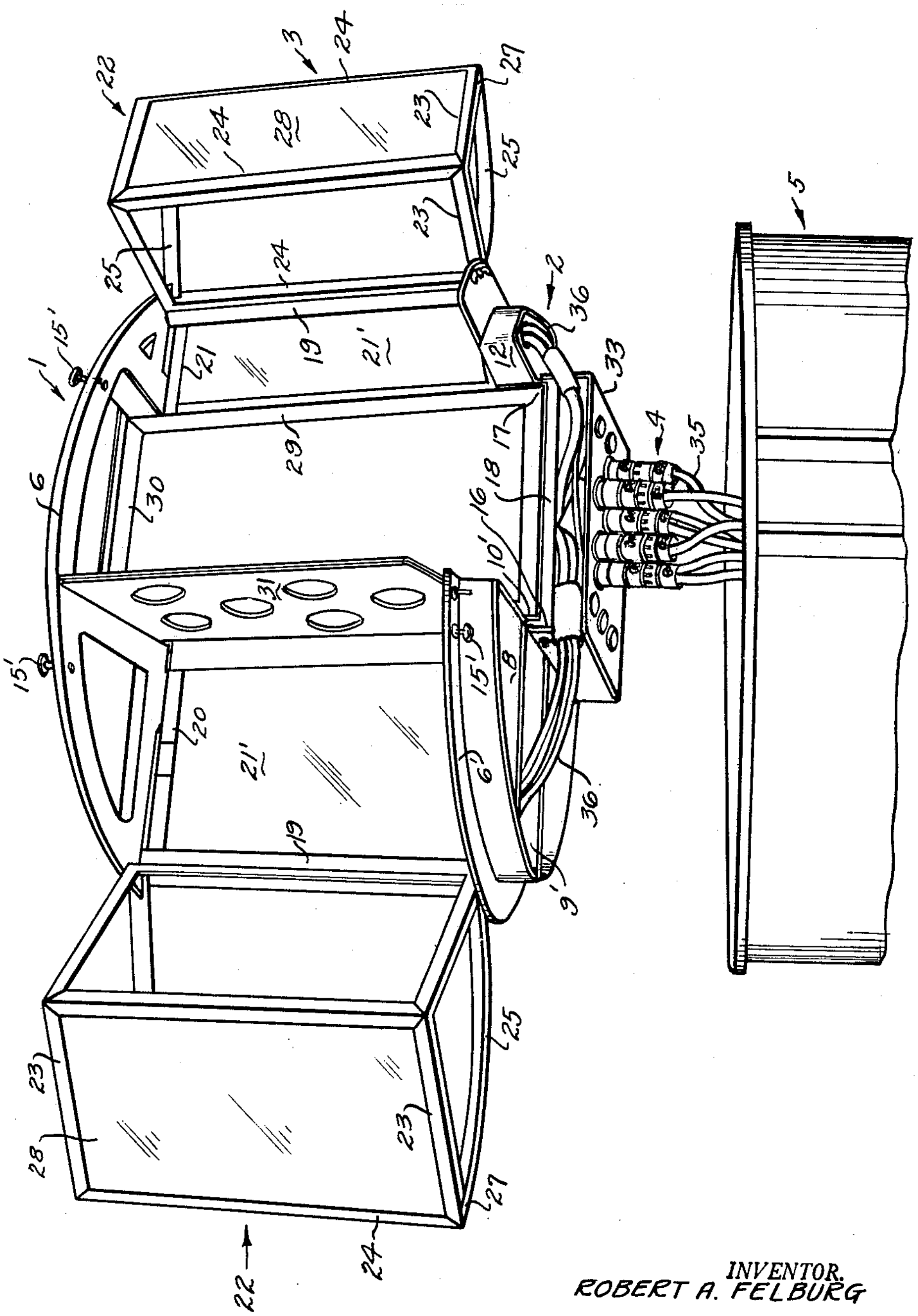
Fig. 2 shows a perspective front view of the novel chassis in a hoisted open condition for mounting equipment thereon.
Figure 3:
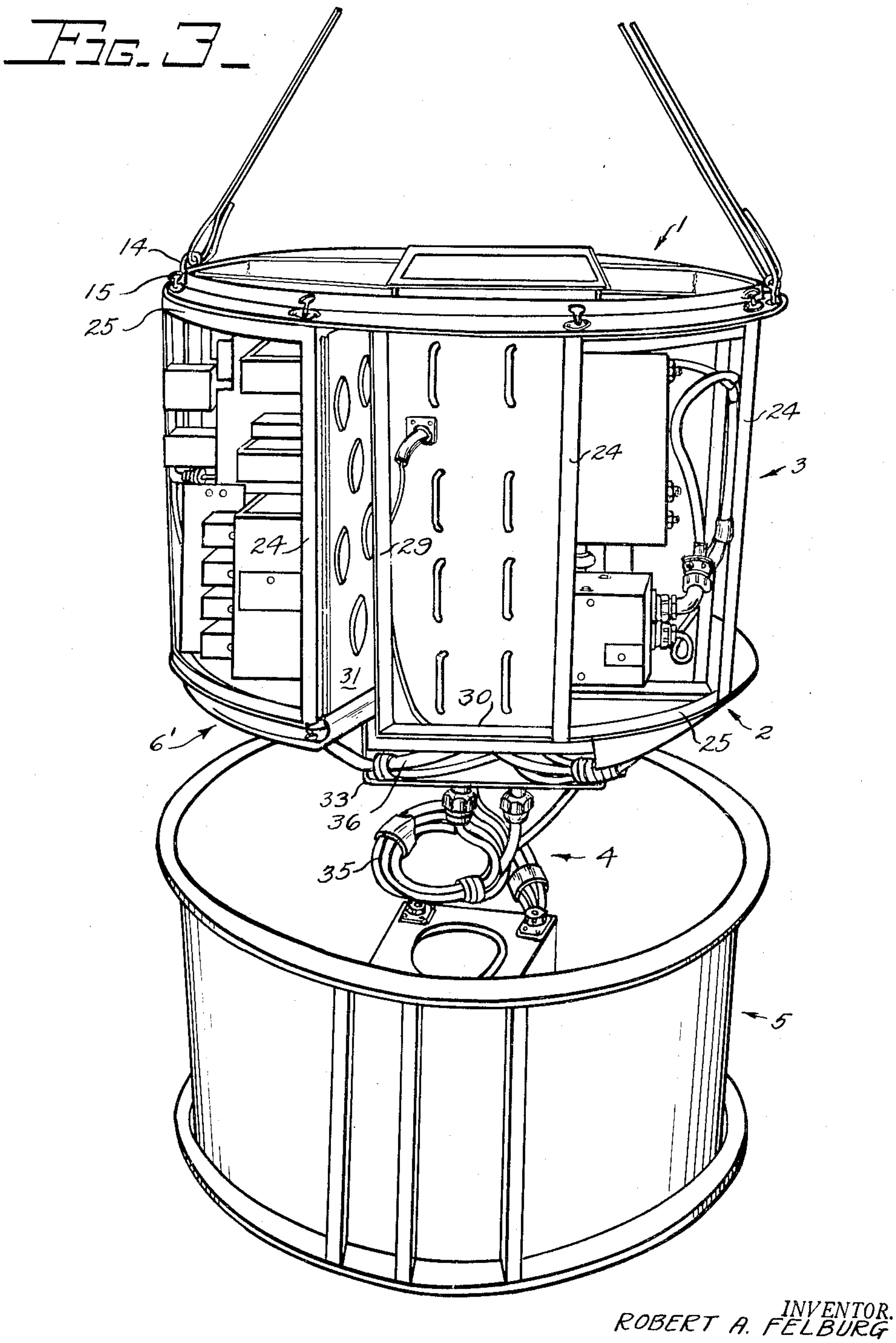
Fig. 3 shows the rear view of the novel chassis in condition for inspection of the equipment mounted thereon.

The details of the novel and improved electronic chassis which constitutes the subject invention may be readily seen with reference to the single practical embodiment thereof shown in the drawings in combination with a container therefor. The open framework or rack assembly comprises an upper open framework cover 1 connected to a lower cover and adapter assembly 2 by an equipment mounting section 3, the adapter assembly being shown affording a connection to a power unit 4 in an air conditioned pressurized container 5. Fig. 1 shows the chassis in hoisted condition effected by a hoisting unit W. The upper open framework cover 1 comprises a flanged ring member 6 having its flange extending outwardly. Welded to and forming a chord of the ring member is a section of angle iron 7. Substantially equidistantly spaced inwardly from the respective ends of the member 7 are respecively angle members 8 and 9 arranged parallel to each other and connected by welding between member 7 and the ring member 6. Spaced from and in parallel relation to member 7 and connected by welding to the inner surface of the ring member is a section 10 of angle iron connected by welding to another section 11 welded to the ring member 6 and arranged at right angles to the section 10. Intermediate the section 11 is connected a right angle element 12 arranged parallel to chord member 7 and welded to the ring member 6 at its outer end. A right angle element 13 is arranged parallel to element 11, spaced therefrom, and connected to the ring member and member 12 respectively. Hoisting hooks 14 are secured to the flange of ring 6 adjacent its periphery. Spaced about the ring member adjacent the outer edge of its flange are threaded apertures. Threadedly engaging such apertures through mounting brackets 15 are thumbscrews 15'.

The lower open framework cover 2 is basically similar to the upper cover 1 comprising a flanged ring member 6' inverted with respect to the upper ring member 6. Reinforcing elements 7' through 13', similar to the upper cover reinforcing elements are welded to ring member 6'. The cover 2 differs from the upper cover 1 as follows. The flanged ring member 6' is interrupted between the members 7' and 12'. Welded to the bottom and in the plane of members 7' and 12' are depending angle iron members 16 and 17 having their flanges at substantially right angles to the said planes and arranged in the same plane. The flanges of members 16 and 17 are connected at their extremities by parallel bars 18, forming a support platform therewith.

Four bars 19 spaced about the ring members connect the upper and lower ring members, being welded thereto, forming an integral structure therewith. Two bar members 19 are spaced on opposite sides of the ring members and define a rectangular opening in each side in which are located rectangular open framework 20 and 21 respectively, each framework being formed of right angle iron sections with inwardly extending flanges to define an enclosure for instrument units thereby and having closure panels 21' fastened in any suitable manner at the back and one side of each framework whereby to afford support for instrument units thereon.

Triangular chassis structures 22 composed of sections of angle iron are arranged in the form of a cylindrical sector. There are four arranged between the upper and lower ring members and since they are formed in identical fashion only one need be described in detail. Sections 23 of angle iron arranged horizontally are joined by vertical sections 24 to define a rectangular framework section. Two such sections are welded together as can be seen in the drawings to define a right angle therebetween. Curved sections 25 of angle iron respectively join the outer upper and lower extremities of the rectangular sections to define a cylindrical sector framework. In the corners of the upper and lower portions of the sectors where the curved sections join the side members are threaded apertures 27. The chassis sections so formed seat between the upper and lower ring members and are secured therein by the thumbscrews 15'. By removal of an aligned upper and lower thumbscrew from each sector, the chassis section can pivot outwardly of the framework of the rack assembly. A panel 28 is fastened to one flat side of each cylindrical sector to afford a mounting surface for electronic equipment. Thus there are four spaced sectors hingedly mounted about the assembly.

Centrally of the assembly is a rectangular framework composed of four vertical angle iron sections 29 connected at their extremities by angle iron sections 30 at right angles thereto. All sections are arranged to have inwardly extending flanges with the exception of the horizontal sections 30 at the upper extremities of the vertical elements 29 so that the central framework can be lowered into the top of the rack assembly so that the outwardly extending flanges of upper sections 30 are supported by ring elements 7 and 12. The lower section of the central rectangular framework seats in the depending section of the lower open framework cover defined by elements 16, 17 and 18.

Connected between the upper and lower elements 10 and 10' is a perforated heat exchange plate 31 adjacent the interrupted portion of the lower ring member.

Mounted on the lower ring member on the side opposite its interrupted portion is a rectangular framework 32 formed of angle iron sections welded together in a manner similar to rectangular frameworks 20 and 21. This framework 32 is secured in the rack by thumbscrews 15' and may be pivoted outwardly of the framework in a manner similar to the cylindrical sectors 22.

Bolted to the depending members 16 and 17 is an adapter unit 33 having spaced openings therein in which are mounted connector elements 34 which afford a means to connect to the power lines 35 in the container and to the lines 36 to the electronic equipment mounted on the rack.

In the practical embodiment of the invention disclosed herein a heat exchanger is located in the rack container and the interruption in the lower ring 6' serves to accommodate the heat exchanger when assembled in the container.

The ready accessibility of the electronic equipment mounted on the rack in its various sections can be clearly seen with reference to the drawings. Noting Fig. 1 thereof, a hoist such as shown may be attached to the lifting hooks 14 on the upper ring member 6 and the whole rack with its assembled mounted equipment can be lifted clear of the container while maintaining the power connections thereto as shown.

The ease and economy with which equipment mounted on the novel rack may be maintained and serviced is readily apparent from the drawings and presents a distinct improvement and significant advance in the art. The rack in its novel form, moreover, requires a minimum of material and is simple to fabricate. As the cylindrical sectors are swung out all equipment mounted in the various sectors is readily available.

While a specific practical embodiment and application of the invention has been shown herein, many other modifications and applications thereof will be readily apparent therefrom to those versed in the art. Such modifications and applications are considered to be within the scope of the invention as defined by the claims.

I claim:

1. In combination with a container having electric terminal connections to the bottom thereof a removable electronic chassis for mounting electronic equipment comprising an upper ring member, a lower ring member, means connecting said ring members in parallel spaced relation defining an open framework, support sections within the framework and intermediate the spaced rings normally locked to the perimeter thereof at spaced points by bolt members whereby a removal of certain of said bolt members, said support sections will pivot outward of said framework in hinged relation thereto, and means depending from said bottom ring member having electrical connections for cooperation with the electric terminals on said bottom of the container whereby on lifting the electronic chassis from said container an operative electrical connection is maintained and ready access to all equipment mounted on said framework may obtain.

2. An electronic chassis for use in a container having electric connections to the bottom thereof comprising an upper ring member, a lower ring member, means connecting said upper and lower ring members to define an open framework, support members integral with the respective ring members, open framework support units connected to the ring members at vertically aligned points by removable bolt members, said support units each being pivotable about a pair of said bolts to swing outward from the perimeter of said ring members, and a central removable framework supported by said support members whereby a chassis readily detachable obtains providing ready access to electronic equipment mounted thereon for inspection, replacement and servicing.

3. An electronic chassis for use in an outer container having electric terminal connections thereto for supply of power to electronic equipment mounted on said chassis comprising a cylindrical open framework defined by an upper and a lower ring maintained in spaced parallel relation by connecting members, mounting sectors for electronic equipment pivotally connected with the ring members in hinged relation thereto, a rectangular mounting sector for electronic equipment supported on said ring members in slidable relation relative thereto and centrally thereof and means on one of said ring members for establishing an operative connection with said electric terminals whereby a chassis obtains rendering all electronic equipment mounted thereon readily accessible in operable condition.

4. An electronic chassis for use in an outer container having electric terminals mounted on the bottom thereof comprising an upper ring member, a lower ring member, each ring member having a horizontal flange, spaced vertical connecting members maintaining said ring members in spaced parallel relation, mounting sectors arranged between said upper and lower ring members having arcuate sides respectively aligning with the flanges of the ring members, aligned apertures in the flanges and said arcuate sides, bolt members in said aligned apertures pivotally connecting the sectors in hinged relation with said ring members, and a central framework mounted intermediate said sectors for slidable relation relative to the rings.

References Cited in the file of this patent

UNITED STATES PATENTS

| | | |
|---|---|---|
| 241,123 | Danner | May 10, 1881 |
| 1,045,729 | Mooney | Nov. 26, 1912 |
| 2,486,764 | Singer | Nov. 1, 1949 |